(12) United States Patent
Chen

(10) Patent No.: US 6,758,965 B2
(45) Date of Patent: Jul. 6, 2004

(54) APPARATUS FOR TREATING WASTEWATER FROM CATERING INDUSTRY

(75) Inventor: Guang Hao Chen, Kowloon (HK)

(73) Assignee: Great Vision Bioenvironmental Engineering Limited, Admiralty (HK)

( * ) Notice: Subject to any disclaimer, the term of this patent is extended or adjusted under 35 U.S.C. 154(b) by 108 days.

(21) Appl. No.: 10/222,892

(22) Filed: Aug. 19, 2002

(65) Prior Publication Data

US 2004/0031734 A1 Feb. 19, 2004

(51) Int. Cl.⁷ .................................................. C02F 3/28
(52) U.S. Cl. ...................... 210/151; 210/209; 210/533; 210/540; 210/608; 210/616
(58) Field of Search ................... 210/150, 151, 210/538, 540, 533, 257.1, 608, 616, 617, 618, 209

(56) References Cited

U.S. PATENT DOCUMENTS

| | | | |
|---|---|---|---|
| 4,670,149 A | * 6/1987 | Francis | 210/150 |
| 4,940,544 A | * 7/1990 | Gode et al. | 210/608 |
| 5,227,051 A | * 7/1993 | Oshima | 210/151 |
| 5,567,314 A | * 10/1996 | Chigusa et al. | 210/150 |
| 5,750,041 A | * 5/1998 | Hirane | 210/151 |
| 5,861,098 A | 1/1999 | Morrison | |
| 5,911,877 A | * 6/1999 | Perez et al. | 210/150 |
| 6,110,371 A | * 8/2000 | Axelsson | 210/608 |
| 6,187,193 B1 | * 2/2001 | Ozama | 210/608 |

* cited by examiner

Primary Examiner—Christopher Upton
(74) Attorney, Agent, or Firm—Rabin & Berdo, P.C.

(57) ABSTRACT

The invention relates to an apparatus for treating wastewater from catering industry, especially restaurants. Said apparatus comprises a single reactor tank, said reactor tank comprising: an inlet; an outlet; and an oil-tight tank therein an upper oil film zone, an anoxic zone below said oil film zone and an anaerobic zone below said anoxic zone are divided; an upper net and a lower net are respectively located in the anoxic and anaerobic zones; and some plastic suspending media as biocarriers are introduced in the anoxic and anaerobic zones. The apparatus requires minimal space, energy and operation costs.

18 Claims, 1 Drawing Sheet

APPARATUS FOR TREATING WASTEWATER FROM CATERING INDUSTRY

TECHNICAL FIELD OF THE INVENTION

The present invention relates to wastewater treatment and, more particularly, to an apparatus for treating wastewater from catering industry such as restaurants, caterers, etc.

BACKGROUND OF THE INVENTION

Improperly managed oil and grease from restaurants has become a significant problem for wastewater collection and treatment systems. Fats, oils, and grease (often referred to as FOG) are not soluble; meaning they do not mix well with water. Due to this, FOG floats on water and clings to surface areas void of water. If excessive FOG in a wastewater is directly discharged into a sewer collection system, FOG may be accumulated therein, thus causing potential blockage of the piping in the collection system. Also, there exist serious sludge foaming problems in the secondary sewage treatment works.

Consequently, many local codes require the removal of FOG from wastewater prior to go down the drain.

It is well known that oil/grease separators are capable of separating immiscible liquids having different specific gravities. Known oil/grease separators have been disclosed in many U.S. Patents, such as U.S. Pat. No. 5,861,098. However, such some systems are complex, energy demanding, expensive to build and operate and not suitable for discharging to the sewer system.

Several modifications of wastewater treatment processes have been developed: 1. aerobic (activated sludge process, lagoon systems, and biofiltration); 2. anaerobic (various attached and suspended growth processes); and 3. coupled anaerobic-aerobic systems. However, for wastewater from catering industry such as restaurants etc, due to the space and cost constraints as well as the characteristics of the wastewater, conventional biotreatment technology for wastewater is not applicable.

Accordingly, there is a need for an on-site, low cost and space-saving biotreatment facility for treating a high concentration of FOG.

SUMMARY OF THE INVENTION

The present invention is an apparatus which has been developed to meet the needs discussed above and overcome the drawbacks of the prior art.

It is an object of the invention, therefore, to provide an apparatus for treating wastewater from catering industry, particularly from the restaurants. Specifically, the apparatus comprises a single reactor tank, said reactor tank comprising:

(a) an inlet arranged to feed wastewater influent into said reactor tank;

(b) an open and substantially oil-tight tank therein an upper oil film zone, anoxic zone below said oil film zone and an anaerobic zone below said anoxic zone are divided; said anoxic and anaerobic zones are layered, but without clearly defined phase separation between them; an upper net is located in said anoxic zone and a lower net is located in said anaerobic zone; and some plastic suspending media as biocarriers are introduced into said anoxic and anaerobic zones;

(c) an outlet arranged to discharge the effluent from said reactor tank to the main drain.

The apparatus in accordance with present invention further comprises:

a second outlet for draining the excessive FOG; a third outlet for dumping the excessive sludge; a circulation conduit with a pump located between the bottom of said reactor tank and said lower net and fluidly connected to said inlet pipe.

The apparatus in accordance with the present invention further comprises:

an upflow back wash conduit which is placed near the bottom of said reactor tanks and has ¼ diameter of said inlet pipe.

The apparatus in accordance with the present invention further comprises:

a flow equalization tank for storing and controlling of the wastewater.

It is contemplated that the present apparatus will be employed for treating wastewater drained from restaurant sinks and the treated wastewater may be directly discharged to conventional sewers in an environmentally-safe manner in compliance with typing local codes. The oil and grease removed from the wastewater is held in a convenient storage vessel for ultimate disposal.

In addition to improved efficiency in separating oil and grease from wastewater, the present apparatus advantageously requires minimal space, energy and operation costs. Further, biological sludge produced therein is much lower than aeration systems and is suitable for sludge thickening and dewatering.

One embodiment of the invention will now be described in conjunction with the accompanying drawings in which:

DETAILED DESCRIPTION OF PREFERRED EMBODIMENT

Figure 1:
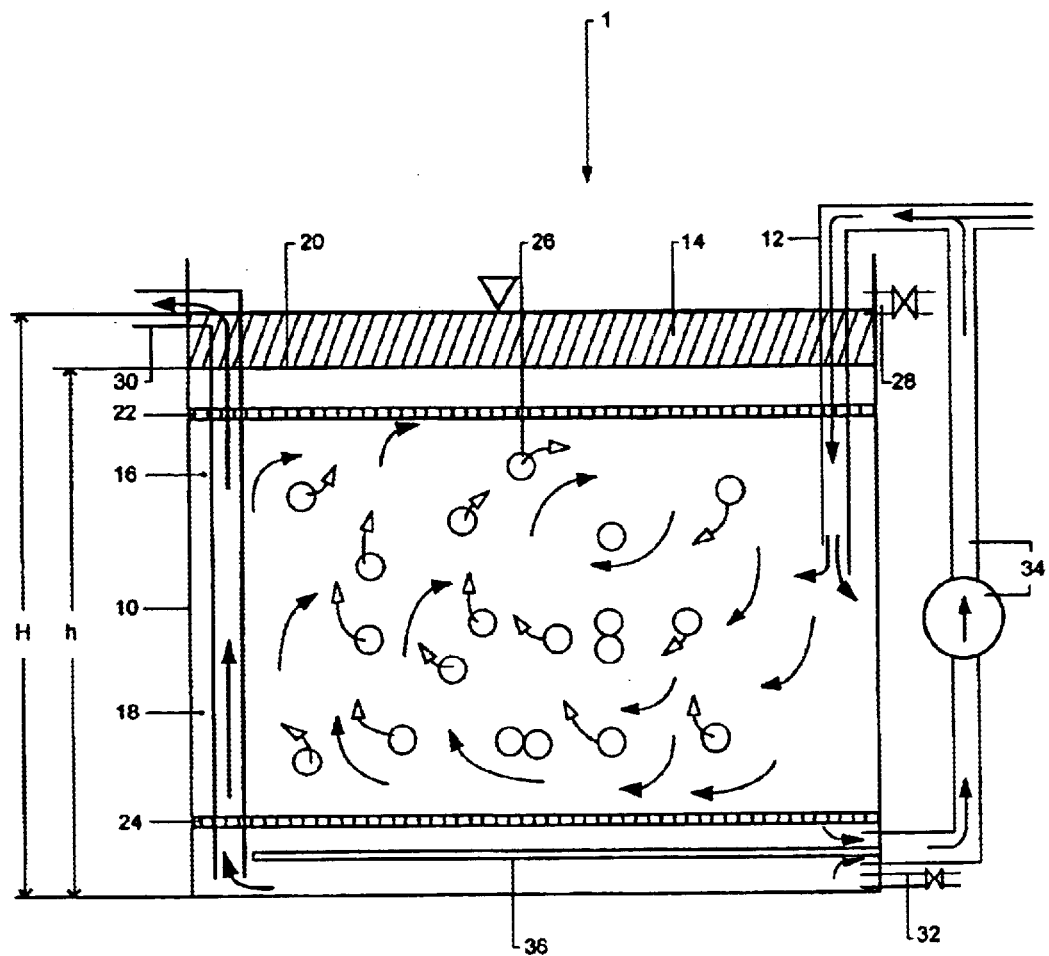
FIG. 1 is diagrammatical side view in cross section of the apparatus in accordance with the present invention.

Referring now to FIG. 1, the present apparatus 1 comprises a single reactor tank 10, an inlet section of said reactor tank comprising an inlet port for introducing wastewater into said reactor tank and a back wash port for washing said reactor tank, a discharge section of said reactor tank comprising an outlet port for discharging the effluent from said reactor tank to the main drain, (also referred to as first outlet), a second outlet port for draining the excessive FOG, a third outlet port for dumping the excessive sludge, a circulation conduit with a pump located between the bottom of said reactor tank and said lower net, and fluidly connected to said inlet pipe, and a flow equalization tank fluidly connected to said reactor tank.

In this embodiment, said reactor tank 10 is arranged for treating wastewater from restaurant, thereby reducing FOG in the wastewater to an acceptable level and directly discharging into the main drain. The reactor tank 10 consists of an open top, a base and walls. In a preferred embodiment, said reactor is made of stainless steel and is sized to hold about 2.6 m$^3$ of liquid. The wastewater is distributed from the flow equalization tank (not shown) through an inlet pipe 12 into the reactor tank 10. After entering the reactor tank 10, the heavier liquid sinks and the lighter liquid rises and is collected, thereby forming an oil film layer therein. Preferably, said oil film has a thickness of 1–2 cm. In order to maintain such an oil thickness, a second outlet 28 with a valve is put in place near the oil surface for draining the excessive FOG. The reactor tank 10 is divided into three zones: an upper oil film zone 14, an anoxic zone 16 below said oil film zone 14 and an anaerobic zone 18 below said anoxic zone 16 therein anoxic and anaerobic zones 16 and 18 are layered, but without clearly defined phase separation between them.

In order to enable the anoxic or anaerobic process to be taken place under strict conditions (i.e. absence of oxygen and very low redox potential), the oil-tight layer on the surface of wastewater has to be kept. For this reason, said inlet pipe 12 must be arranged in such a manner that it is directly introduced through said oil film zone 14 into wastewater to be treated so that the inlet port is at least under the boundary surface 20 of oil film and wastewater. Preferably, said inlet port is in a position at 10%–60% of the depth h of wastewater to be treated.

Besides, an upper net 22 and a lower net 24 are respectively installed in said anoxic and anaerobic zones 16 and 18 in parallel to the liquid surface. Preferably, said upper net is set at 60–90% of the height H of said reactor tank 10, whereas said lower net is set at 15–30% of the height H of said reactor tank 10.

The present bioreactor utilizes a biocarrier structured of some plastic suspending media 26 which are non-toxic and highly biocompatible. These biocarriers have a rough hydrophilic surface which promotes the adherence of microorganisms. In accordance with the present invention, some plastic suspending media 26 as biocarries are introduced into said anoxic and anaerobic zones 16 and 18.

Additionally, these biocarriers will also facilitate the formation of oil particles from dissolved FOG through their intermotion induced by the upflow. The formed oil particles rise and are collected. The formed oil film at the surface of the wastewater is able to prevent oxygen penetration from air phase into the water phase so that an anoxic stage in the apparatus is sustained. Preferably, he diameter of said biocariers is in the region of 20–50 mm and said biocarriers contained in the wastewater to be treated are in the region of 5–45% by volume of the wastewater. In the presence of attached biomass growth on the biocarriers, a relative short hydraulic retention time (HRT) can be realized in the present apparatus. Generally speaking, the apparatus was able to achieve an almost complete treatment at a hydraulic retention time (HRT) of 1–4 hours. The anoxic environment leads to the predomination of acidifying biomass that can effectively degrade FOG into easily biodegradable organic acids such as acetate. At the bottom of the reactor tank, an anaerobic zone is developed to degrade organic acids produced in the acidification through the fermentation. With the concentrated anoxic biomass, an efficient removal of FOG matter can be achieved. It can also be expected that both odor and excess sludge generation can be minimized due to the anoxic condition.

The treated effluent is discharged from the bottom of said reactor tank to the main drain through an outlet conduit 30 therein the outlet port is set at 80–90% of the height H of said reactor tank, and the inlet port is set at least below said lower net 24.

In addition, sludge generated sedimetates at the bottom of said reactor tank, and is taken off through said third outlet 32.

In order to provide a high quality of effluent, the present apparatus is also provided with a circulation conduit 34 with a pump located between the bottom of said reactor tank 10 and said lower net 24, and fluidly connect to said inlet pipe 12. If necessary, the treated wastewater may be removed from the reactor tank through the circulation conduit 34 and again transferred to the reactor tank 10 via the inlet pipe 12, thereby re-treating the same.

It is contemplated that the present apparatus 1 requires only routine flushing with clean water or the wastewater from the flow equalization tank. For this reason, an upflow back wash conduit 36 is placed near the bottom of said reactor tank in such a manner that all the sludge sedmietated on the bottom of said reactor tank is fully flushed away. In order to provide with a higher pressure, said upflow back wash conduit has ¼ diameter of said inlet pipe.

The benefits achieved in the practice of the invention are illustrated in the Example below.

EXAMPLE

In the present apparatus, the wastewater discharged from a restaurant was used as the raw waste to carry out experiments. A submerged biofilter unit using plastic suspending media as biocarriers having a diameter of 20 mm and its quantity of 7.6% by volume of the wastewater was used for the anoxic and anaerobic biological treatment of the wastewater. The capacity of the reactor tank was 0.01 $m^3$. The capacity of the submerged biofilter was $7.6 \times 10^{-4}$ $m^3$. The flow rate of the starting wastewater was 0.06~0.12 $m^3$/day.

Changes in water quality are shown in Table 1.

TABLE 1

| Item | Raw waste (mg/L) | Effluent (mg/L) | Removal (%) |
|------|------------------|-----------------|-------------|
| * O&G | 336 | 69 | 80 |
| COD | 1468 | 279 | 81 |
| SS | 191 | 50 | 74 |
| PH | 8.1 | 4.6 | — |
| ORP | — | −150 (mv) | — |

* dissolved O&G was measured with n-hexane extraction technique

Therefore, it has been demonstrated that an apparatus within the scope of the invention is much more effective in removing oil and greases from wastewater than a prior art. Further, the present apparatus is superior to the prior art in required space and energy, and operation costs.

It will be readily apparent to those skilled in the art that various changes ad modifications of an obvious nature may be made without departing from the spirit of the invention, and all such changes and modifications are considered to fall within the scope of the invention as defined by the appended claims.

What is claimed is:

1. An apparatus for treating wastewater from catering industry, said apparatus comprising a single reactor tank, said reactor tank comprising:

(a) an inlet arranged to feed wastewater influent into said reactor tank;

(b) an open and substantially oil-tight tank having therein an upper oil film zone, an anoxic zone below said oil film zone and an anaerobic zone below said anoxic zone are divided; wherein said anoxic and anaerobic zones are layered, but without clearly defined phase separation between them;

an upper net is located in said anoxic zone;

a lower net is located in said anaerobic zone; and plastic suspending media as biocarriers are suspended in said anoxic and anaerobic zones between set nets;

(c) an outlet arranged to discharge the effluent from said reactor tank to the main drain.

2. The apparatus for treating wastewater of claim 1 wherein said inlet compromises a pipe which passes through said oil film into wastewater to be treated so that an inlet port is at least under the boundary surface of oil and wastewater.

3. The apparatus for treating wastewater of claim 2 wherein said inlet port is in a position at 10–60% of the depth of the wastewater to be treated.

4. The apparatus for treating wastewater of claim 1, further comprising:
   a second outlet for draining the excessive FOG;
   a third outlet for dumping the excessive sludge;
   a circulation conduit with a pump located between the bottom of said reactor tank and said lower net, and fluidly connected to said inlet pipe.

5. The apparatus for treating wastewater of claim 4 wherein said second outlet with a valve is set at 80–90% of the height of said reactor tank in order to keep the thickness of said oil film zone in the region of 1–2 cm.

6. The apparatus for treating wastewater of claim 1, further comprising: an upflow back wash conduit placed near the bottom of said reactor tank.

7. The apparatus for treating wastewater of claim 6 wherein said upflow back wash conduit has ¼ diameter of said inlet pipe.

8. The apparatus for treating wastewater of claim 1, further comprising: a flow equalization tank for storing of the wastewater.

9. The apparatus for treating wastewater of claim 1 wherein said oil film zone has a thickness of 1–2 cm.

10. The apparatus for treating wastewater of claim 1 wherein said upper and lower nets are horizontally set at 60–80% and 15–30% of the height of said reactor tank respectively.

11. The apparatus for treating wastewater of claim 1 wherein said outlet is set at 80–90% of the height of said reactor tank.

12. The apparatus for treating wastewater of claim 11 wherein an inlet port of said outlet is set at least below the lower net.

13. The apparatus for treating wastewater of claim 1 wherein an inlet port of said outlet is set at least below the lower net.

14. The apparatus for treating wastewater of claim 1 wherein a second outlet with a valve is set at 80–90% of the height of said reactor tank in order to keep the thickness of said oil film zone in the region of 1–2 cm.

15. The apparatus for treating wastewater of claim 1 wherein a third outlet with a valve is set at the bottom of said reactor tank in order to dump the excessive sludge.

16. The apparatus for treating wastewater of claim 1 wherein said biocarriers have a diameter of 20–50 mm.

17. The apparatus for treating wastewater of claim 1 wherein said biocarriers contained in the wastewater to be treated are approximetly 5–45% by volume of the wastewater.

18. The apparatus for treating wastewater of claim 1 wherein said apparatus was able to achiever an almost complete treatment at a hydraulic retention time (HRT) of 1–4 hours.

* * * * *